P. SCHOU.
APPARATUS FOR ABSORBING GASES OR VAPORS.
APPLICATION FILED JUNE 15, 1910.
1,001,460.
Patented Aug. 22, 1911.
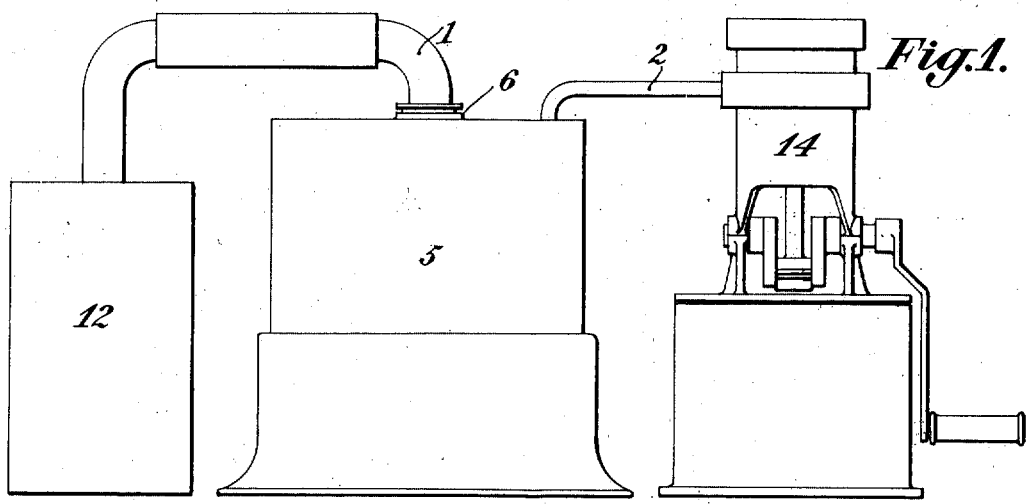
Fig. 1.
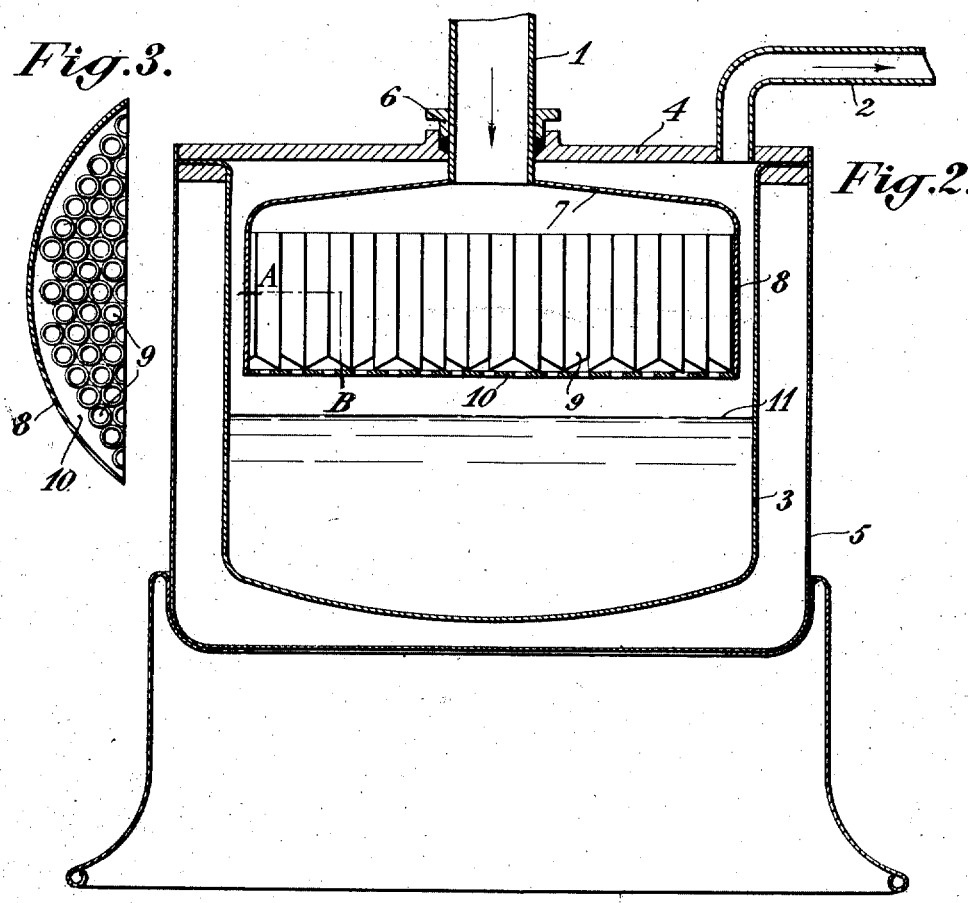
Fig. 3.
Fig. 2.
Witnesses:
John Murtagh
L. J. Murphy
Inventor:
Paul Schou

UNITED STATES PATENT OFFICE.

PAUL SCHOU, OF COPENHAGEN, DENMARK.

APPARATUS FOR ABSORBING GASES OR VAPORS.

1,001,460.

Specification of Letters Patent.   Patented Aug. 22, 1911.

Application filed June 15, 1910. Serial No. 566,933.

*To all whom it may concern:*

Be it known that I, PAUL SCHOU, a citizen of the Kingdom of Denmark, residing in Copenhagen, in said Kingdom, have invented certain new and useful Improvements in Apparatus for Absorbing Gases or Vapors, of which the following is a specification.

This invention relates to an improved apparatus for absorbing gases or vapors by intimate contact with a minutely-divided absorption liquid, while at the same time the carrying along of small particles of the absorption-liquid by the current of gas or vapors is avoided.

The subject-matter of the invention is shown in the accompanying drawing, in which—

Figure 1 represents a side-elevation of the absorber for a vacuum refrigerating machine, Fig. 2 is a vertical central section through the absorber, drawn on a larger scale, and Fig. 3 is a detail horizontal section through a portion of the same, on line A B, Fig. 2.

Similar reference characters indicate corresponding parts throughout the figures.

Referring to the drawing, the vessel 3 of the absorber is filled with absorption liquid, for instance, sulfuric acid, up to the level 11. In the upper portion of the vessel 3 is arranged a hollow body 7, 8, 10, which is made slidable by means of a tube 1 in a stuffing-box 6 in the top 4 of the absorber, so as to be vertically adjustable in the vessel. The bottom 10 of the hollow body 8 is perforated and filled up to a certain height with small pieces of pumice stone, glass pearls, or, as shown in the drawing, with a plurality of upright glass tubes 9 which are tapering at their lower ends. The gases or vapors, as, for instance, the water-vapors from the cooler 12 of the vacuum refrigerating machine are conducted through the pipe 1 into the hollow body 7, 8 and passed in minutely divided condition over the inner and outer surfaces of the glass-tubes after the hollow body has first been immersed into the absorption-liquid and then withdrawn from the same, then over the surface of the absorption-liquid and over the exterior surfaces of the hollow body 7, 8, which are also covered on their surface with a film of the absorption-liquid and are finally drawn off by the vacuum-pump 14 through the suction-pipe 2. The cooler 12 is connected to the tube 1 by means of a flexible hose 1ª and the up and down movement of the pipe is easily accomplished by hand. It is obvious that by this arrangement and the process of diffusing the absorption-liquid in very thin films over a large contact-surface, a considerable quantity of gases or vapors can be quickly and reliably absorbed by the liquid without producing the objectionable carrying along of any traces or particles of the absorption liquid through the pipe 2 to the air-pump 14. As soon as the absorption-liquid loses its capacity for absorption by saturation the process is interrupted and the hollow body with its contact-surfaces immersed again into the absorption liquid and withdrawn from the same, after which the process of absorption is continued.

When it should be necessary to cool the vessel 3, a jacket 5 or any other cooling device, is arranged around the same through which cooling water is conducted. In place of making the hollow body movable, it can be made stationary, and, on the other hand, the vessel containing the absorption liquid can be made movable, so as to renew from time to time the covering of the surfaces of the hollow body with the absorption liquid.

Having thus described my invention, I claim as new and desire to secure by Letters Patent:

1. An apparatus for the absorption of gases or vapors, which comprises a vessel for the absorption liquid, a hollow body arranged in the same and adapted to be immersed in the liquid, said hollow body being provided with a perforated bottom and with closed top and sides, contact bodies, separate from the top thereof, for receiving films of the absorption liquid for absorbing the gases or vapors passing over the same, and means for causing the passage of said gases or vapors downwardly through said hollow body and over said contact bodies.

2. An apparatus for absorbing gases or vapors, which comprises a vessel for the absorption liquid, a hollow body adapted to be immersed into the same and provided with a perforated bottom and closed sides and top, contact-bodies located in the hollow body, separate from the top thereof, a suction-pipe connecting the hollow body with the space to be evacuated, and a suction-pipe connecting the vessel for the absorption liquid with a suction-pump.

3. An apparatus for absorbing gases or vapors, comprising a closed vessel for the absorption-liquid having a top with an opening therein, a hollow body in said absorption-vessel having a perforated bottom and closed top and sides, a suction-pipe connecting the hollow body with the space to be evacuated, said suction-tube passing through the opening in the top of the vessel, contact-bodies placed in said hollow body separate from the top thereof, and a second suction-pipe leading from the top of the sorption-vessel to the vacuum-pump, drawing the gases or vapors in downwa direction over the surfaces of the conta bodies and around the hollow vessel af immersion into the absorption-liquid.

In testimony, that I claim the foregoi as my invention, I have signed my name presence of two subscribing witnesses.

PAUL SCHOU.

Witnesses:
P. HOFMAN BAUG,
E. MAURITZEN.